United States Patent
Jankowsky et al.

(10) Patent No.: US 7,702,664 B2
(45) Date of Patent: Apr. 20, 2010

(54) APPARATUS, SYSTEM, AND METHOD FOR AUTONOMIC LARGE FILE MARKING

(75) Inventors: Joshua James Jankowsky, Raleigh, NC (US); Jennifer J. Lee-Baron, Morrisville, NC (US); David Wayne Wall, Cary, NC (US); Peter Hamilton Wetsel, Raleigh, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 403 days.

(21) Appl. No.: 11/616,265

(22) Filed: Dec. 26, 2006

(65) Prior Publication Data

US 2008/0154990 A1    Jun. 26, 2008

(51) Int. Cl.
*G06F 17/30* (2006.01)
(52) U.S. Cl. .................. 707/206; 707/205; 707/200
(58) Field of Classification Search ......... 707/200–206; 710/5, 10
See application file for complete search history.

(56) References Cited

U.S. PATENT DOCUMENTS 7,092,977 B2 * 8/2006 Leung et al. ................ 707/205
7,251,661 B1 * 7/2007 Reed et al. .................. 707/101

* cited by examiner

*Primary Examiner*—Yicun Wu
(74) *Attorney, Agent, or Firm*—Kunzler Needham Massey & Thorpe

(57) ABSTRACT

An apparatus, system, and method are disclosed for autonomic large file marking. A threshold module sets a file size threshold. An identification module identifies each file that exceeds the file size threshold and that is not marked with a limited backup status. A user interface module may query a user if each identified file is to be marked. In response to a user direction to mark the identified file, the marking module may mark with the limited backup status each identified file. In an embodiment, the marking module selects a limited backup status from an exclusion backup status and a single storage backup status.

12 Claims, 6 Drawing Sheets

300

APPARATUS, SYSTEM, AND METHOD FOR AUTONOMIC LARGE FILE MARKING

BACKGROUND OF THE INVENTION

1. Field of the Invention

This invention relates to marking files and more particularly relates to autonomically marking large files.

2. Description of the Related Art

Data processing devices (DPD) such as computer workstations, servers, mainframe computers, laptop computers, personal digital assistants, and the like often store very valuable data. As a result, individuals and organizations typically back up the data from DPDs. For example, an organization may back up the computer workstations of all employees over a network. Alternatively, an individual may back up a laptop computer to a backup tape device.

The data of a DPD may comprise one or more files organized in one or more directories. Some files may be of a significantly large size such that backing up the large files on a regular basis adds appreciably to the cost of data backup. For example, some backup operations regularly make backup copies every hour. Over time, many backup copies may be made. The significantly large size files in the backup copies may substantially increase the cost of this regular backup operation.

In an alternate example, a backup operation may maintain multiple copies of backup files for a DPD data instance. Copies may be maintained concurrently on magnetic tape, hard disk drives, and the like. The multiple copies of the significantly large size files also increase the cost of multiple copy backup operations.

As a result, some backup operations allow users to identify files with a limited backup status. For example, a user may mark a large file with a limited backup status so that the marked file is not backed up in the future.

Unfortunately, the user may not be aware of all the large files on a DPD that could have a limited backup status. In addition, the files may grow to a very large size over time without coming to the user's attention as requiring a limited backup status.

SUMMARY OF THE INVENTION

From the foregoing discussion, there is a need for an apparatus, system, and method for autonomic large file marking. Beneficially, such an apparatus, system, and method would autonomically mark large files with limited backup status and may reduce costs for storing files.

The present invention has been developed in response to the present state of the art, and in particular, in response to the problems and needs in the art that have not yet been fully solved by currently available systems for marking large files. Accordingly, the present invention has been developed to provide an apparatus, system, and method for autonomic large file marking that overcome many or all of the above-discussed shortcomings in the art.

The apparatus to autonomically mark large files is provided with a plurality of modules configured to functionally execute the steps of setting a file size threshold, identifying each file that exceeds the file size threshold, and marking each file. These modules in the described embodiments include a threshold module, an identification module, and a marking module. The apparatus may further include a user interface module.

The threshold module sets a file size threshold. The identification module identifies each file that exceeds the file size threshold. Additionally, the identification module identifies each file that is not marked with a limited backup status. The marking module marks with the limited backup status each identified file that satisfies a marking policy. The marking policy may be an automatic policy. The marking module may mark each identified file. Each file marked with the limited backup status may be excluded from a backup operation. Alternatively, each file marked with the limited backup status is backed up with a single storage.

In an alternative embodiment, the marking policy is a user choice policy. The user interface module may further query a user if each identified file is to be marked and the marking module may mark each identified file with the limited backup status in response to a user direction to mark the identified file.

A system of the present invention is also presented for autonomic large file marking. The system may be embodied in a data processing system that provides backup for each file. In particular, the system, in one embodiment, includes a storage device and a data processing device. The data processing device includes a threshold module, an identification module, and a marking module. The data processing device of the system may further include a user interface module. The data processing device may also include the storage device.

The storage device stores files. The threshold module sets a file size threshold. The identification module identifies each file in the storage device that exceeds the file size threshold. Additionally, the identification module identifies each file that is not marked with a limited backup status. The marking module marks with the limited backup status each identified file that satisfies a marking policy. The marking policy may be an automatic policy. The marking module may mark each identified file. Each file marked with the limited backup status may be excluded from a backup operation. Alternatively, each file marked with the limited backup status is backed up with a single storage.

In an alternative embodiment, the marking policy is a user choice policy. The user interface module may further query a user if each identified file is to be marked and wherein the marking module marks each identified file with the limited backup status in response to a user direction to mark the identified file.

A method of the present invention is also presented for autonomic large file marking. The method in the disclosed embodiments substantially includes the steps to carry out the functions presented above with respect to the operation of the described apparatus and system. In one embodiment, the method includes setting a file size threshold, identifying each file that exceeds the file size threshold and that is not marked with a limited backup status, querying a user, and marking each identified file. The method also may include selecting a limited backup status.

The threshold module sets the file size threshold. The identification module identifies each file that exceeds the file size threshold. Additionally the identification module identifies that is not marked with a limited backup status. The user interface module queries a user if each identified file is to be marked. In response to a user direction to mark the identified file, the marking module marks with the limited backup status each identified file. In an embodiment, the marking module selects a limited backup status from an exclusion backup status and a single storage backup status.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention autonomically marks large files with a limited backup status. Additionally, the present invention may reduce costs of storing backup copies by limiting the large file copies in backup instances. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
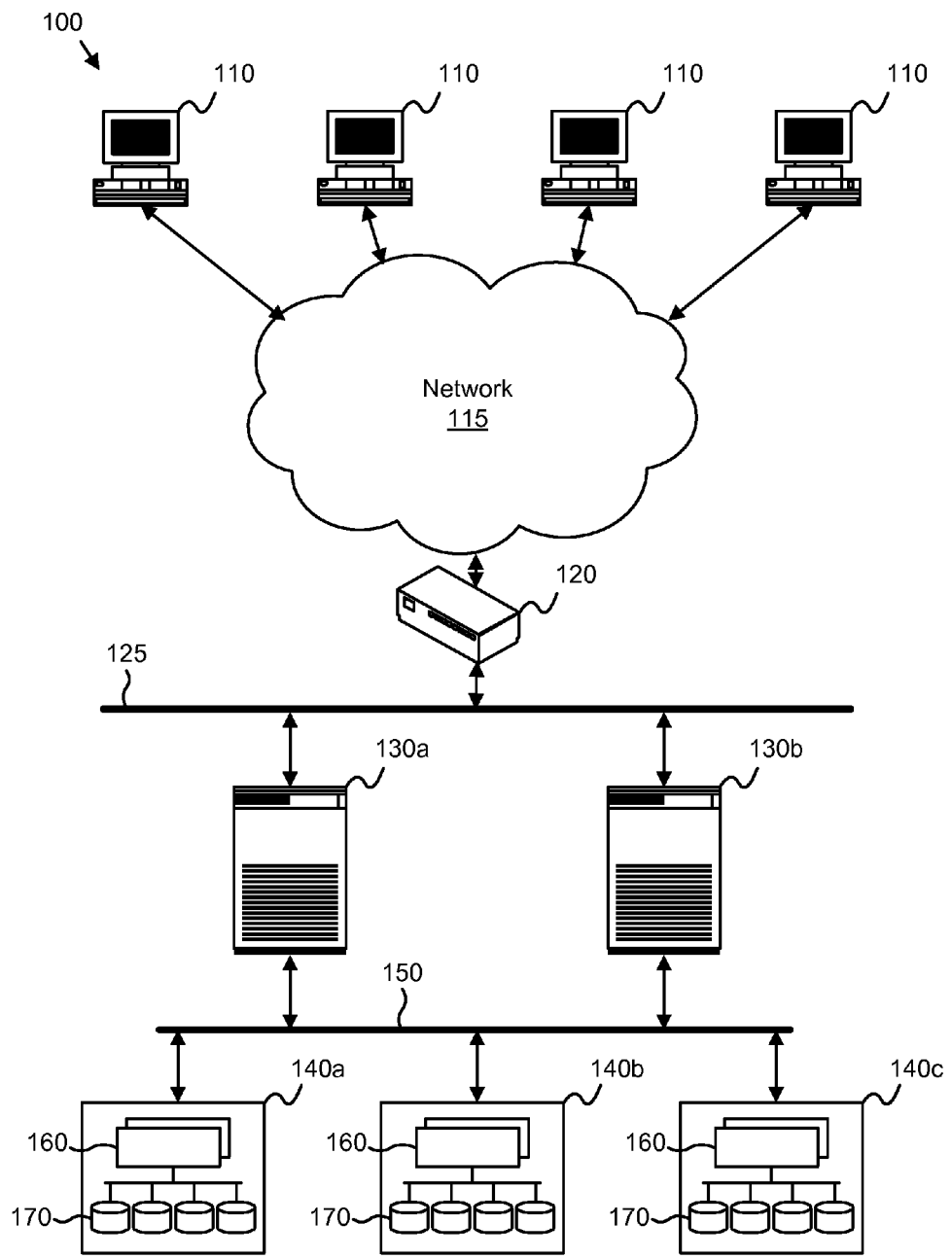
FIG. 1 is a schematic block diagram illustrating one embodiment of a data processing system in accordance with the present invention.

FIG. 1 is a schematic block diagram illustrating one embodiment of a data processing system (DPS) 100 in accordance with the present invention. The DPS 100 includes one or more client computers 110, a network 115, a router 120, an internal network 125, one or more servers 130, a storage communications channel 150, and one or more storage subsystems 140.

As used herein, the client computers 110 are referred to as clients 110. The servers 130 may also be configured as mainframe computers, blade centers comprising multiple blade servers, and the like. Although for simplicity four clients 110, one network 115, one router 120, one internal network 125, two servers 130, one storage communications channel 150, and three storage subsystems 140 are shown, any number of clients 110, networks 115, routers 120, internal networks 125, servers 130, storage communications channels 150 and storage subsystems 140 may be employed. One of skill in the art will also readily recognize that the DPS 100 could include other data processing devices such as bridges, scanners, printers, and the like.

Each storage subsystem 140 includes one or more storage controllers 160 and one or more storage devices 170. In an embodiment, the storage devices 170 are hard disk drives. The storage devices 170 may also be optical storage devices, magnetic tape drives, micromechanical storage devices, holographic storage devices, and semiconductor storage devices.

In one embodiment, the DPS 100 provides data storage and data manipulation services for the clients 110. For example, a client 110 may access data stored on a storage device 170 of a storage subsystem 140 by communicating a request through the network 115, the router 120, the internal network 125, a server 130, and the storage communications channel 150 to a storage controller 160 for the storage device 170. The storage controller 160 may retrieve the data from the storage device 170 and communicate the data to the client 110. In one embodiment, the server 130 may execute a database application used by the client 110 to access the data.

In an embodiment, the DPS 100 provides a file backup to each of the clients 110. For example, the DPS 100 may provide the file backup by automatically creating and storing corresponding backup files for each accessed file of a client 110 in appropriate directories of a storage subsystem 140 over the network 115 by one or more methods known to those skilled in the art. Alternatively, the DPS 100 may provide a local file backup by automatically creating corresponding backup files for each accessed file in appropriate directories of each client 110 to a backup holographic storage device for each of the clients 110 respectively. The client 110 may communicate with the network 115, the backup holographic storage device, and the like for creating backup files, either through cables, optical fibers, and/or wireless connections as are well known to those skilled in the art. All other communications between the router 120, the internal network 125, one or more servers 130, the storage communications channel 150, and one or more storage subsystems 140 may also be through cables, optical fibers, and/or wireless connections as are well known to those skilled in the art.

The storage device 170 stores files. For example, the storage device 170 may store files using a disk file systems such as file allocation table (FAT), new technology file system (NTFS), hierarchical file system (HFS), hierarchical file system plus (HFS+), second extended file system (ext2), third extended file system (ext3) and/or the like to store the files of certain size created by one or more clients 110 in appropriate directories. In another example, the storage device 170 may store files using one hierarchical file system (HFS) to store a file A of a size of two hundred megabytes (200 MB) and a file B of a size of three hundred megabytes (300 MB) in directory A and directory B respectively.

Figure 2:
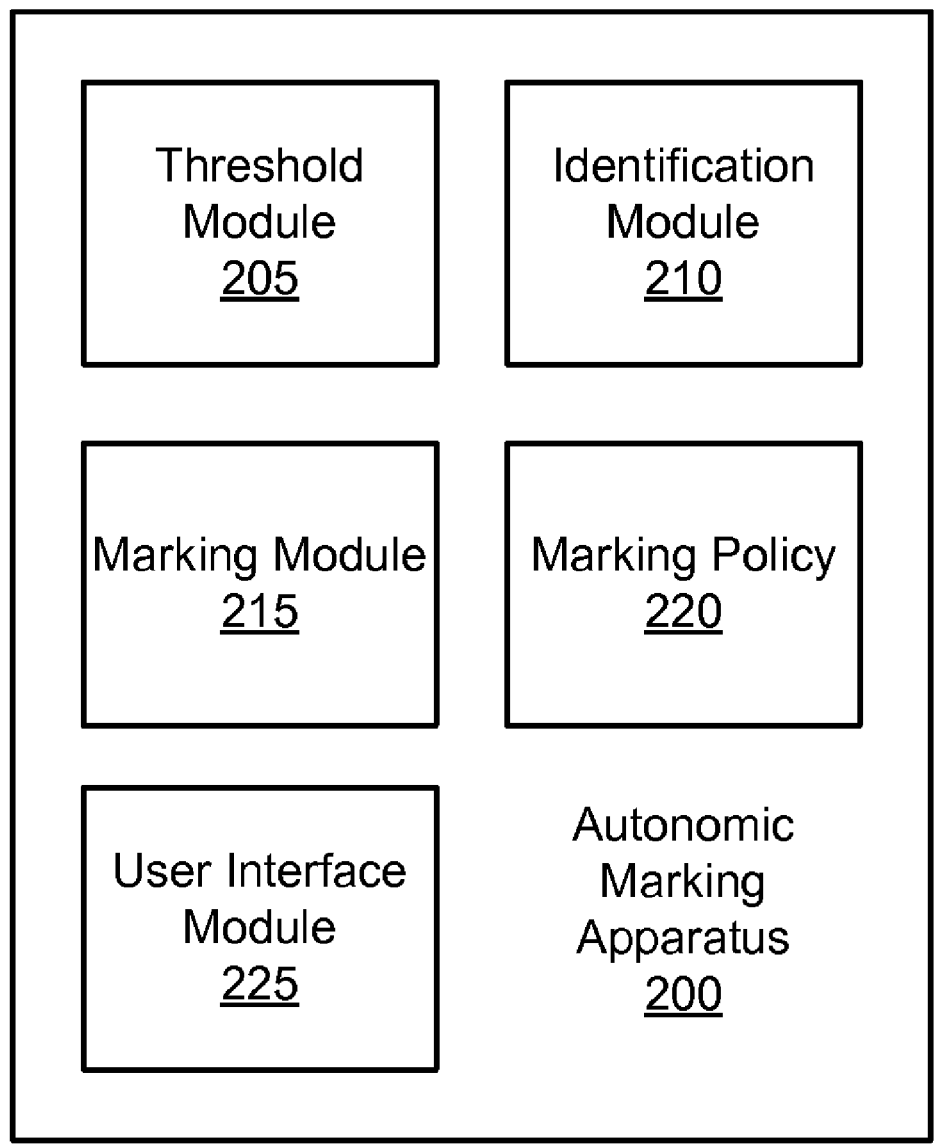
FIG. 2 is a schematic block diagram illustrating one embodiment of a autonomic marking apparatus of the present invention.

FIG. 2 is a schematic block diagram illustrating one embodiment of an autonomic marking apparatus 200 of the present invention. The apparatus 200 autonomously marks large files with limited backup status and can be embodied in the DPS 100 of FIG. 1. The description of apparatus 200 refers to elements of FIG. 1, like numbers referring to like elements. The apparatus 200 includes a threshold module 205, an identification module 210, and a marking module 215. The apparatus may further include a user interface module 225.

The threshold module 205 sets a file size threshold. For example, the threshold module 205 may set a file size of two hundred twenty five megabytes (225 MB) as the file size threshold.

The identification module 210 identifies each file in a storage device of a client 110 that exceeds the file size threshold. For example, the identification module 210 may identify that the file B of the size of three hundred megabytes (300 MB) in directory B exceeds the set file size threshold of two hundred twenty five megabytes (225 MB).

The marking module 215 marks with a limited backup status each identified file that satisfies a marking policy 220. The marking policy 220 may be an automatic policy. For example, if the size of the identified file exceeds the file size threshold, the file size threshold may be regarded as the marking policy 220. In another example, since the identified file B of the size of three hundred megabytes (300 MB) in directory B exceeds the file size threshold of two hundred twenty five megabytes (225 MB) and hence satisfies the marking policy 220, the marking module 215 may mark the identified file B with the limited backup status.

Alternatively, in an embodiment, the marking policy 220 is a user choice policy. For example, a user may input that for an identified file, the marking module 215 through the user interface module 225 should always query the user prior to marking the identified file with limited backup status as the user choice policy. The user interface module 225 may query the user if each identified file is to be marked. For example, the user interface module 225 may query the user that the identified file B of the size of three hundred megabytes (300 MB) is to be marked with limited back up status. In response to a user direction to mark the identified file, the marking module 215 marks each identified file with the limited backup status. For example, in response to the user direction to mark the identified file, the marking module 215 may mark the identified file B of the size of three hundred megabytes (300 MB) with the limited backup status.

The autonomic marking apparatus 200 may exclude each file marked with the limited backup status from a backup operation. For example, the autonomic marking apparatus 200 may exclude the marked file B of the size of three hundred megabytes (300 MB) in directory B from the backup operation.

Alternatively, the autonomic marking apparatus 200 may back up each file marked with the limited backup status with a single storage. As used herein, single storage refers to backing up a file with a single backup instance of the file. For example, the marked file B of the size of three hundred megabytes (300 MB) in the directory B may be backed up with a single storage by creating one instance of file B.

Figure 3:
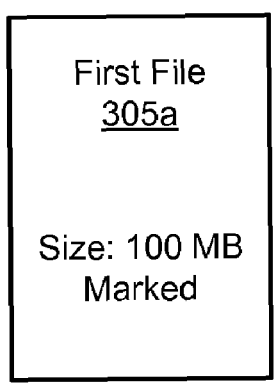
FIG. 3 is a schematic block diagram illustrating one embodiment of files of the present invention.
Figure 3:
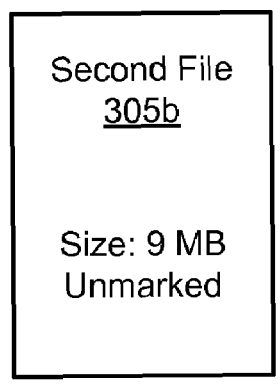
Figure 3:
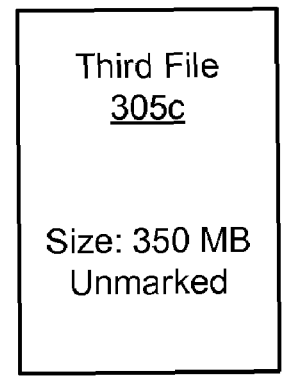
Figure 3:
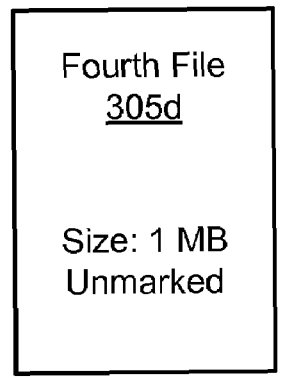
Figure 3:
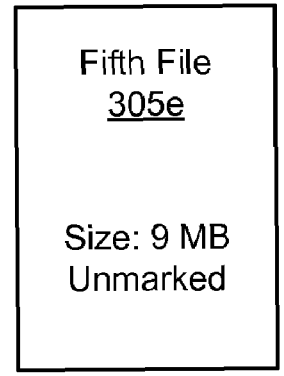
Figure 3:
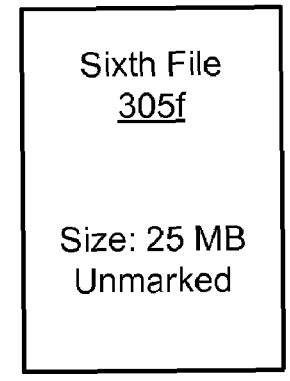

FIG. 3 is a schematic block diagram illustrating one embodiment of files 300 of the present invention. The files 300 include a first file 305a, a second file 305b, a third file 305c, a fourth file 305d, a fifth file 305e, and a sixth file 305f. Although for simplicity six files 305a-f are shown, the DPS 100 can handle any number of files 305.

In the shown embodiment, the marked first file 305a is of the size of hundred megabytes (100 MB), the unmarked second file 305b is of the size of nine megabytes (9 MB), the unmarked third file 305c is of the size of three hundred fifty megabytes (350 MB), the unmarked fourth file 305d is of the size of one megabyte (1 MB), the unmarked fifth file 305e is of the size of nine megabytes (9 MB), and the unmarked sixth file 305f is of the size of twenty five megabytes (25 MB). The files 305 may be user created files. Alternatively, the files 305 may include system files, hidden files, and the like.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
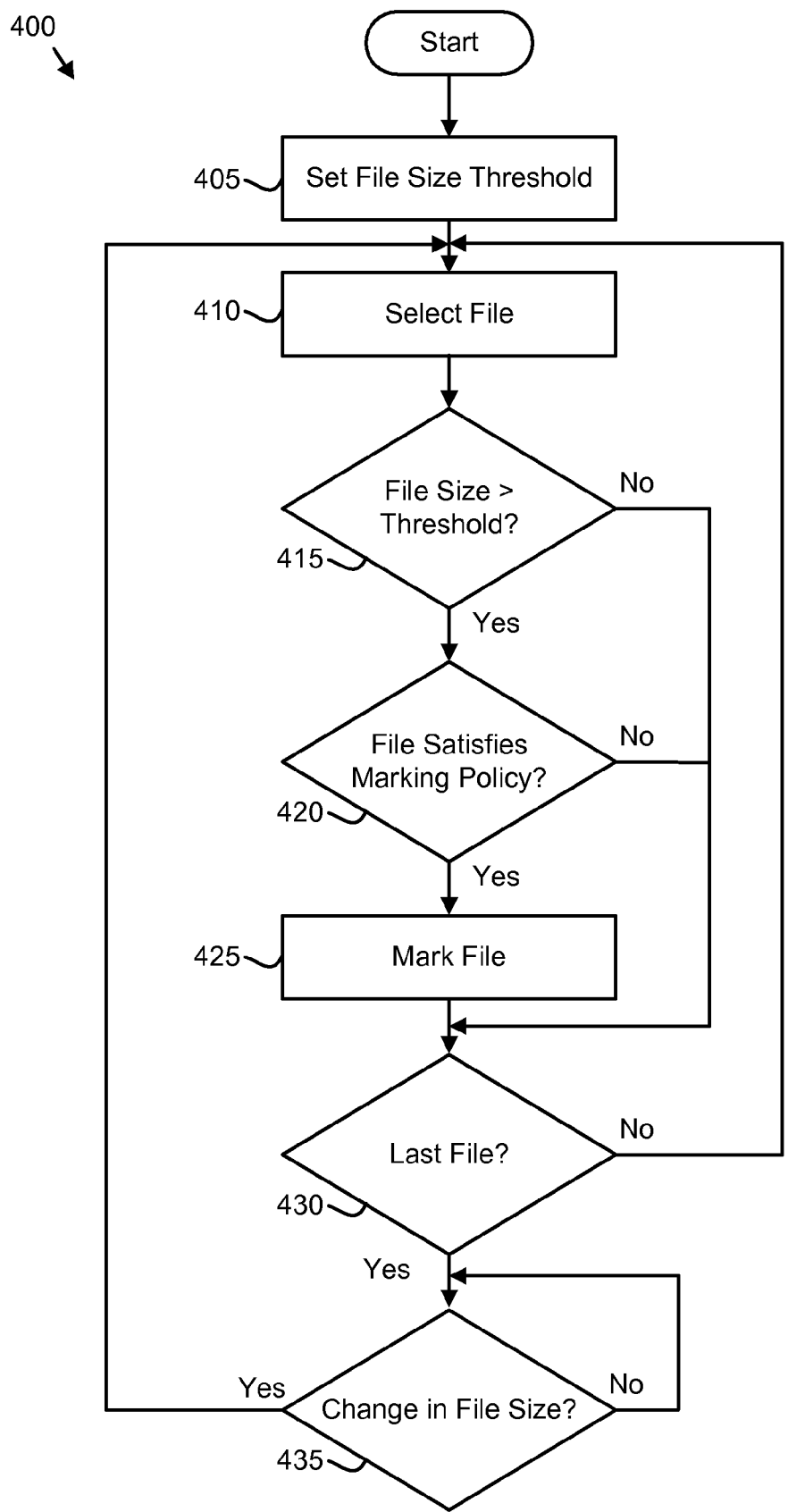
FIG. 4 is a schematic block diagram illustrating one embodiment of an autonomic marking method of the present invention.

FIG. 4 is a schematic block diagram illustrating one embodiment of an autonomic marking method 400 of the present invention. The method 400 substantially includes the steps to carry out the functions presented above with respect to the operation of the described apparatus 200 and system 100 of FIGS. 2 and 1 respectively. The description of method 400 refers to elements of FIGS. 1-3, like numbers referring to the like elements. In one embodiment, the method 400 is implemented with a computer program product comprising a computer readable medium having a computer readable program. The computer readable program may be executed by a client 110, a server 130, and the like.

The method 400 begins, and in an embodiment, the threshold module 205 sets 405 a file size threshold. In one embodiment, the file size threshold is in the range of twenty megabytes to one hundred gigabytes (20 MB-100 GB). In a certain embodiment, the file size threshold is in the range of fifty to one hundred megabytes (50-100 MB). For example, the threshold module 205 may set 405 ninety-five megabytes (95 MB) as the file size threshold.

The DPS 100 selects 410 a file 305. For example, the DPS 100 may select 410 the first file 305a of one hundred megabytes (100 MB).

The identification module 210 identifies 415 if the file size exceeds the file size threshold. For example, the identification module 210 may identify 415 that the first file 305a size of hundred megabytes (100 MB) exceeds the file size threshold of ninety-five megabytes (95 MB).

If the identification module 210 identifies 415 that the selected file size exceeds the file size threshold, the marking module 215 may further determine 420 if the identified file satisfies 420 the marking policy 220. The marking policy 220 may be an automatic policy. For example, the marking module 215 may automatically choose to mark the identified file if the file size exceeds the set file size threshold. Alternatively, in an embodiment, the marking policy 220 is a user choice policy. For example, a file 305 with a file size that exceeds the file size threshold may be marked as directed by the user.

If the marking module 215 determines 420 that the identified file satisfies 420 the marking policy 220, the marking module 215 further marks 425 the identified file with the limited backup status. For example, the marking module 215 may mark 425 the identified first file 305a with the limited backup status since the first file 305a of the size of hundred megabytes (100 MB) exceeds the file size threshold of ninety-five megabytes (95 MB) and hence satisfies the automatic marking policy 220.

The DPS 100 further determines 430 if the selected file 305 is the last file. For example, the DPS 100 may determine 430 that the selected first file 305a is not the last file of files on a client 110.

If the DPS 100 determines 430 that the selected file 305 is not the last file, the DPS 100 selects 410 another file 305. For example, if the DPS 100 determines 430 that the selected first file 305a is not the last file, the DPS 100 may select 410 the second file 305b of the size of nine megabytes (9 MB).

If the DPS 100 determines 430 that the selected file is the last file 305, the system 100 further determine 435 if there is change in the size of any file 305. For example, if the DPS 100 determines that the fifth file 305e has changed in size, the DPS 100 selects 410 the fifth file 305e and the identification module 210 identifies 415 if the file size of the fifth file 305e exceeds the file size threshold.

If the DPS 100 further determines 435 that there is no change in the size of a file 305, the system 100 may loop to determine 435 if the there is a change in the size of the file 305. Thus any file 305 that is modified is tested.

Figure 5:
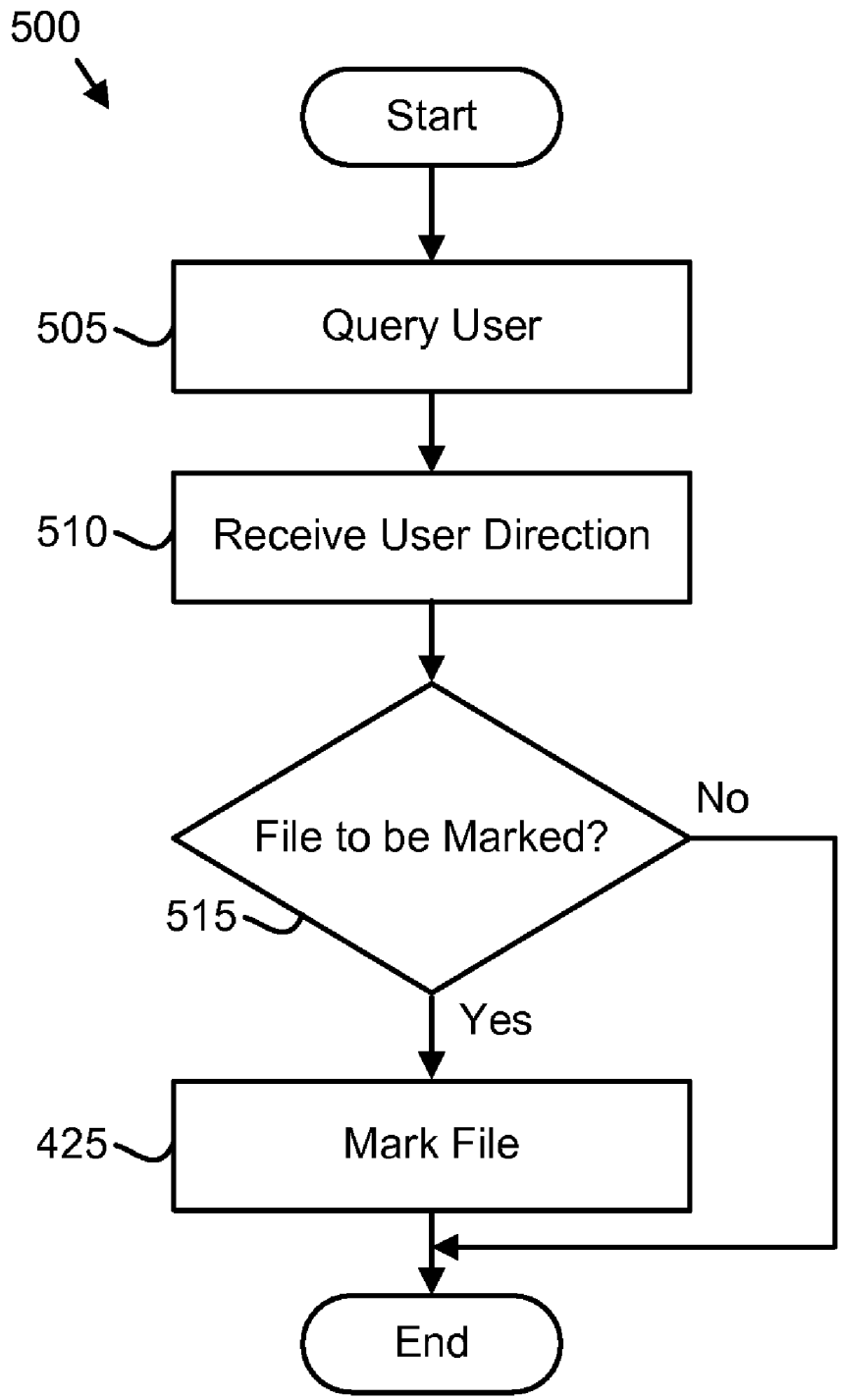
FIG. 5 is a schematic flow chart diagram illustrating one embodiment of a query method of the present invention.

FIG. 5 is a schematic flow chart diagram illustrating one embodiment of a query method 500 of the present invention. The method 500 substantially includes the steps to carry out the functions presented above with respect to the operation of the described method 400, apparatus 200, and DPS 100 of FIGS. 4, 2 and 1 respectively. The description of method 500 refers to elements of FIGS. 1-4, like numbers referring to the like elements. In one embodiment, the method 500 is implemented with a computer program product comprising a computer readable medium having a computer readable program. The computer readable program may be executed by a client 110 and/or a server 130.

The method 500 begins, and in an embodiment, the user interface module 225 queries 505 the user if each identified file is to be marked. For example, if the identification module 210 identifies the third file 305c of the size of three hundred fifty megabytes (350 MB) as exceeding the file size threshold of ninety-five megabytes (95 MB), the user interface module 225 may query 505 the user by issuing a written notification appearing on a screen of a client 110.

The user interface module 225 receives 510 the user's direction. Further, the marking module 215 determines 515 if the identified file is to be marked with limited backup status. For example, if the user directs the user interface module 225 to mark the identified file, the marking module 215 may further determine 515 that the identified file is to be marked 425 with limited backup status as described for step 425 of FIG. 4.

In an alternate embodiment, if the user directs the user interface module 225 not to mark the identified file, the user interface module 225 further determines 515 that the identified file is not to be marked with limited backup status, and the method 500 terminates. For example, if the user directs the user interface module 225 not to mark the identified file, the user interface module 225 may determine 515 that the identified third file 305c of the size of three hundred megabytes (350 MB) is not to be marked with limited backup status.

Figure 6:
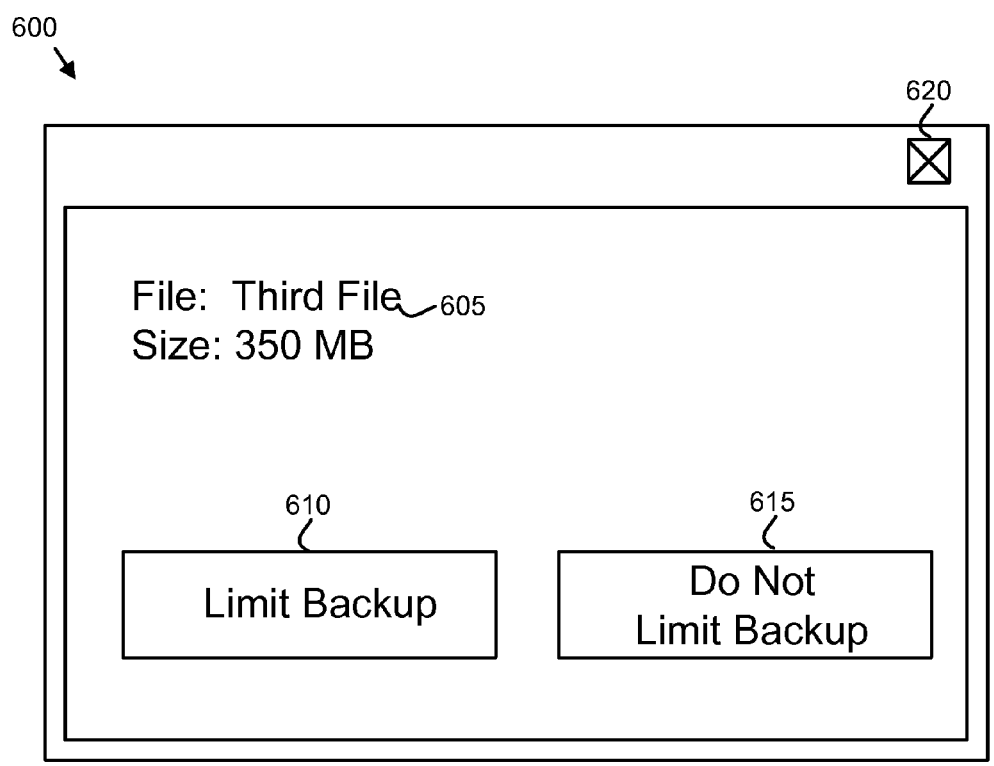
FIG. 6 is a drawing illustrating one embodiment of a user interface of the present invention.

FIG. 6 is a drawing illustrating one embodiment of a user interface 600 of the present invention. The user interface module 225 may display the user interface 600 to query 505 the user that an identified file is to be marked 425 with limited backup status or not. The description of the user interface 600 refers to elements of FIGS. 1-5, like numbers referring to the like elements.

The user interface module 225 displays the user interface 600 to query 505 the user by showing the identified file of the size that exceeds the set threshold limit 220 in a window of a screen of a client 110. Additionally, the user interface module 225 displays the user interface 600 with a button 610 for receiving 510 the user's direction to limit a backup status to the identified file, a button 615 for receiving 510 the user's direction not to limit the back up status to the identified file, and a button 620 to close the user interface 600. For example, the user interface module 225 may display the user interface 600 to query 505 the user by showing the identified third file 605 of the size of three hundred fifty megabytes (350 MB) that exceeds the set threshold limit 220 of ninety five megabytes (95 MB) in the window of the screen of the client 110. Additionally, the user interface module 225 may display the button 610 "limit backup" on the user interface 600 for receiving 510 the user's direction to limit a backup status to the identified third file 605, the button 615 "Do not limit backup" for receiving 510 the user's direction not to limit the back up status to the identified third file 605, and the button 620 "X" to close the user interface 600.

The embodiment of the present invention autonomically marks large files with a limited backup status. Additionally, the present invention may reduce costs of storing backup copies by limiting the large file copies in backup instances. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for autonomic large file marking, the apparatus comprising:
    a memory device storing executable code;
    a processor executing the executable code, the executable code comprising
    a threshold module setting a file size threshold;
    an identification module identifying each file with a file size that exceeds the file size threshold and that is unmarked with a limited backup status; and
    a marking module marking with the limited backup status each identified file that satisfies a marking policy and exceeds the file size threshold and is unmarked for the limited backup status, wherein each file marked with the limited backup status is backed up with a single backup instance of the file and excluded from subsequent backup operations.

2. The apparatus of claim 1, wherein the marking policy is a user choice policy and the executable code further comprises a user interface module querying a user if each identified file is to be marked and wherein the marking module marks each identified file with the limited backup status in response to a user direction to mark the identified file.

3. The apparatus of claim 1, wherein the marking policy is an automatic policy and the marking module marks each identified file.

4. A computer useable medium storing a computer readable program, wherein the computer readable program when executed on a computer causes the computer to:
    set a file size threshold;
    identify each file with a file size that exceeds the file size threshold and that is unmarked with a limited backup status; and
    mark with the limited backup status each identified file that satisfies a marking policy and exceeds the file size threshold and is unmarked for the limited backup status, wherein each file marked with the limited backup status is backed up with a single backup instance of the file and excluded from subsequent backup operations.

5. The computer useable medium of claim 4, wherein the marking policy is a user choice policy and the computer readable code further causes the computer to query a user if each identified file is to be marked and mark each identified file with the limited backup status in response to a user direction to mark the identified file.

6. The computer useable medium of claim 4, wherein the marking policy is an automatic policy and the computer readable code further causes the computer to mark each identified file.

7. The computer useable medium of claim 4, wherein the size threshold is in the range of twenty megabytes to one hundred gigabytes.

8. A system for autonomic large file marking, the system comprising:
    a storage device storing files;
    a data processing device comprising a memory device storing executable code and a processor executing the executable code, the executable code comprising
    a threshold module setting a file size threshold;
    an identification module identifying each file in the storage device with a file size that exceeds the file size threshold and that is unmarked with a limited backup status; and
    a marking module marking with the limited backup status each identified file that satisfies a marking policy and exceeds the file size threshold and is unmarked for the limited backup status, wherein each file marked with the limited backup status is backed up with a single backup instance of the file and excluded from subsequent backup operations.

9. The system of claim 8, wherein the marking policy is a user choice policy and the executable code further comprising a user interface module querying a user if each identified file is to be marked and wherein the marking module marks each identified file with the limited backup status in response to a user direction to mark the identified file.

10. The system of claim 8, wherein the marking policy is an automatic policy and the marking module marks each identified file.

11. The system of claim 8, wherein the data processing device includes the storage device.

12. The system of claim 8, wherein the storage device is configured as a hard disk drive.

\* \* \* \* \*